(12) United States Patent
Kawaguchi et al.

(10) Patent No.: US 9,504,966 B2
(45) Date of Patent: Nov. 29, 2016

(54) COMPOSITE SEMI-PERMEABLE MEMBRANE AND METHOD FOR PRODUCING SAME

(75) Inventors: Yoshihide Kawaguchi, Ibaraki (JP); Atsushi Hiro, Ibaraki (JP); Noriaki Harada, Ibaraki (JP); Osamu Hayashi, Ibaraki (JP); Atsuko Mizuike, Ibaraki (JP); Katsumi Ishii, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 971 days.

(21) Appl. No.: 13/121,007

(22) PCT Filed: Sep. 25, 2009

(86) PCT No.: PCT/JP2009/066691
§ 371 (c)(1),
(2), (4) Date: Mar. 25, 2011

(87) PCT Pub. No.: WO2010/035807
PCT Pub. Date: Apr. 1, 2010

(65) Prior Publication Data
US 2011/0174723 A1    Jul. 21, 2011

(30) Foreign Application Priority Data

Sep. 26, 2008  (JP) ................................ 2008-248544
Sep. 25, 2009  (JP) ................................ 2009-221314

(51) Int. Cl.
*B01D 71/56* (2006.01)
*B01D 71/46* (2006.01)
*B01D 69/02* (2006.01)
(Continued)

(52) U.S. Cl.
CPC .............. *B01D 69/02* (2013.01); *B01D 69/12* (2013.01); *B01D 71/46* (2013.01); *B01D 71/56* (2013.01); *C02F 1/441* (2013.01);
(Continued)

(58) Field of Classification Search
None
See application file for complete search history.

(56) References Cited

U.S. PATENT DOCUMENTS 4,277,344 A   7/1981  Cadotte
4,520,044 A   5/1985  Sundet
(Continued)

FOREIGN PATENT DOCUMENTS

CN    1458860        11/2003
JP    55-147106 A    11/1980
(Continued)

OTHER PUBLICATIONS

Coating Manual HRSD, Appendix C, (2011).*
(Continued)

*Primary Examiner* — Krishnan S Menon
(74) *Attorney, Agent, or Firm* — Knobbe Martens Olson & Bear, LLP

(57) ABSTRACT

It is an object of the present invention to provide a composite semi-permeable membrane exhibiting excellent chemical resistance and having practical water permeability and salt-blocking property, and a method for producing the same. The present invention relates to a composite semi-permeable membrane, including a porous support and a skin layer formed on a surface of the porous support, wherein the porous support contains a thermosetting resin porous sheet having a three-dimensional network structure and pores communicating with each other and wherein the thermosetting resin porous sheet has an average pore diameter of 0.01 to 0.4 μm.

4 Claims, 7 Drawing Sheets

(51) Int. Cl.
   *B01D 69/12* (2006.01)
   *C02F 1/44* (2006.01)
   *C02F 103/04* (2006.01)
   *C02F 103/08* (2006.01)

(52) U.S. Cl.
   CPC ...... *B01D 2325/30* (2013.01); *C02F 2103/04* (2013.01); *C02F 2103/08* (2013.01)

(56) References Cited

U.S. PATENT DOCUMENTS

| | | |
|---|---|---|
| 4,529,646 A | 7/1985 | Sundet |
| 4,761,234 A | 8/1988 | Uemura et al. |
| 4,872,984 A | 10/1989 | Tomaschke |
| 4,889,636 A * | 12/1989 | Perry et al. ............ 210/651 |
| 4,948,507 A | 8/1990 | Tomaschke |
| 5,178,766 A | 1/1993 | Ikeda et al. |
| 2003/0036085 A1 | 2/2003 | Salinaro et al. |
| 2003/0066805 A1 | 4/2003 | Andou et al. |
| 2003/0183576 A1 | 10/2003 | Ohara et al. |
| 2004/0222146 A1 | 11/2004 | Hirose et al. |
| 2007/0190880 A1 * | 8/2007 | Dubrow et al. ............ 442/181 |
| 2008/0020192 A1 | 1/2008 | Yen et al. |
| 2008/0149561 A1* | 6/2008 | Chu et al. ............ 210/500.38 |
| 2008/0210626 A1* | 9/2008 | Tsujioka et al. ............ 210/510.1 |
| 2010/0323573 A1* | 12/2010 | Chu et al. ............ 442/153 |

FOREIGN PATENT DOCUMENTS

| | | | |
|---|---|---|---|
| JP | 61-42308 A | | 2/1986 |
| JP | 62-121603 A | | 6/1987 |
| JP | 63-218208 A | | 9/1988 |
| JP | 2-187135 A | | 7/1990 |
| JP | 4-94726 A | | 3/1992 |
| JP | 2000-240579 A | | 9/2000 |
| JP | 2001-181436 A | * | 7/2001 |
| JP | 2001-341138 A | | 12/2001 |
| JP | 2003-96229 A | | 4/2003 |
| JP | 2004-330042 A | | 11/2004 |
| JP | 2004-338208 A | | 12/2004 |
| JP | 2008-13672 A | | 1/2008 |
| JP | 2008-515668 | | 5/2008 |
| WO | WO 2006/073173 A1 | | 7/2006 |
| WO | WO 2007/001405 | | 1/2007 |

OTHER PUBLICATIONS

Notification of Reasons for Refusal dated Aug. 29, 2013 in corresponding Japanese patent application No. 2009-221314.
Extended European Search Report dated Nov. 18, 2013 in corresponding patent application No. 09816221.7.
First Office Action dated Oct. 30, 2012 in corresponding Chinese patent application No. 200980128460.X.
Third Office Action dated Mar. 17, 2014 in corresponding Chinese patent application No. 200980128460.X.
Decision of Refusal dated Mar. 13, 2014 in corresponding Japanese patent application No. 2009-221314.
Translation of the International Preliminary Report on Patentability from the International Bureau, dated May 19, 2011 in corresponding application No. PCT/JP09/066691.
Second Office Action dated Jul. 11, 2013 in corresponding Chinese patent application No. 200980128460.X.
Indian Office Action, dated Sep. 20, 2016, in corresponding Indian Patent Application No. 2660/CHENP/2011.

* cited by examiner

COMPOSITE SEMI-PERMEABLE MEMBRANE AND METHOD FOR PRODUCING SAME

This application is the U.S. National Phase under 35 U.S.C. §371 of International Application No. PCT/JP2009/066691, filed Sep. 25, 2009, which claims priority to Japanese Patent Application No. 2008-248544 and 2009-221314, filed Sep. 26, 2008 and Sep. 25, 2009, respectively. The International Application was not published in English under PCT Article 21(2).

FIELD OF THE INVENTION

The present invention relates to a composite semi-permeable membrane having a skin layer and a porous support that supports the skin layer, and to a process for producing the composite semi-permeable membrane. The composite semi-permeable membranes are suitably used for production of ultrapure water, desalination of brackish water or sea water, etc., and usable for removing or collecting pollution sources or effective substances from pollution, which causes environment pollution occurrence, such as dyeing drainage and electrodeposition paint drainage, leading to contribute to closed system for drainage. Furthermore, the membrane can be used for concentration of active ingredients in foodstuffs usage, for an advanced water treatment, such as removal of harmful component in water purification and sewage usage etc.

BACKGROUND ART

Recently, many composite semi-permeable membranes, in which a skin layer including polyamides obtained by interfacial polymerization of polyfunctional aromatic amines and polyfunctional aromatic acid halides is formed on a porous support, have been proposed (Patent documents 1 to 4). A composite semi-permeable membrane, in which a skin layer including a polyamide obtained by interfacial polymerization of a polyfunctional aromatic amine and a polyfunctional alicyclic acid halide is formed on a porous support, has also been proposed (Patent document 5).

The porous supports include, for example, those in which a microporous layer having a substantial separation function is formed on a surface of a substrate. The substrate includes, for example, a woven fabric, a nonwoven fabric, a mesh net and a foaming sintered sheet, made of materials such as polyester, polypropylene, polyethylene, polyamide and the like. In addition, materials for forming the microporous layer include various materials, for example, such as polyaryl ether sulfones (e.g. polysulfones, polyether sulfones), polyimides and polyvinylidene fluorides, and particularly from the viewpoint of chemical, mechanical and thermal stability, polysulfones and polyaryl ether sulfones have been preferably used.

As for these composite semi-permeable membranes, chemical resistance that can endure various oxidants, particularly chlorine washing, has been required as a result of pursuit of low cost due to more stable operability and simple usability as well as prolongation of membrane lifetime, in various water treatments including desalination plants.

The composite semi-permeable membrane has a practical chemical resistance, but it may not be said that such a membrane has chemical resistance to endure against routine or intermittent chlorine sterilization. Therefore, development of a composite semi-permeable membrane having higher chemical resistance as well as a practical level of water permeability and salt-blocking property, particularly development of a porous support exhibiting an excellent chemical resistance, has been desired.

On the other hand, a porous cured epoxy resin that is a separation medium capable of selectively distinguishing a substance having a plane molecular structure, such as dioxin or PCB (polychlorinated biphenyl), and capable of having a low back pressure, as well as able being processed on a large scale, has been developed (Patent document 6). The porous cured epoxy resin is a non-particle aggregation type porous object including a columnar three-dimensional branched structure, wherein the porous object has a porosity of 20 to 80% and an average pore diameter of 0.5 to 50 µm.

PRIOR ART DOCUMENTS

Patent Documents

Patent document 1: Japanese Patent Application Laid-Open No. 55-147106
Patent document 2: Japanese Patent Application Laid-Open No. 62-121603
Patent document 3: Japanese Patent Application Laid-Open No. 63-218208
Patent document 4: Japanese Patent Application Laid-Open No. 2-187135
Patent document 5: Japanese Patent Application Laid-Open No. 61-42308
Patent Document 6: International Publication No. WO 2006/073173 Pamphlet

DISCLOSURE OF THE INVENTION

Problems to be Solved by the Invention

It is an object of the present invention to provide a composite semi-permeable membrane exhibiting excellent chemical resistance and having practical water permeability and salt-blocking property, and a method for producing the same.

Solutions to the Problems

As a result of intensive investigations for solving the above problems, the present inventors have found that a composite semi-permeable membrane exhibiting excellent chemical resistance and having practical water permeability and salt-blocking property can be obtained by using a thermosetting resin porous sheet that has a specific structure as a porous support, and thus the present invention has been completed.

The present invention relates to a composite semi-permeable membrane, including a porous support and a skin layer formed on a surface of the porous support, wherein the porous support contains a thermosetting resin porous sheet having a three-dimensional network structure and pores communicating with each other and wherein the thermosetting resin porous sheet has an average pore diameter of 0.01 to 0.4 µm.

The thermosetting resin porous sheet shows excellent chemical resistance because it includes a cross-linked thermosetting resin, and further shows high strength (high-pressure resistance) though it has a high porosity due to the continuous three dimensional network structure.

The average pore diameter of the thermosetting resin porous sheet is important from the viewpoint of water permeability and salt-blocking property required for the composite semi-permeable membranes. If the average pore diameter of the thermosetting resin porous sheet is less than 0.01 μm, the permeation flux is significantly decreased. On the other hand, if the average pore diameter is greater than 0.4 μm, the salt-blocking property is significantly decreased because a skin layer cannot be uniformly formed on the porous body.

The thermosetting resin porous sheet is preferably an epoxy resin porous sheet. The epoxy resin porous sheet is especially excellent in chemical resistance and strength property.

The porous support may contain at least the thermosetting resin porous sheet, but it preferably includes only one layer of the thermosetting resin porous sheet.

The skin layer preferably contains a polyamide-based resin from the viewpoint of its practical water permeability and salt-blocking property.

In addition, the present invention relates to a method for producing a composite semi-permeable membrane including the step of forming a skin layer on a surface of a porous support, wherein the porous support contains a thermosetting resin porous sheet having a three-dimensional network structure and pores communicating with each other and wherein the thermosetting resin porous sheet is formed by applying a thermosetting resin composition containing a thermosetting resin, a curing agent and a porogen on a substrate, heating the applied thermosetting resin composition so that the thermosetting resin is cross-linked in three dimensions to obtain a thermosetting resin sheet, and then removing the porogen from the thermosetting resin sheet.

BRIEF DESCRIPTION OF THE DRAWINGS

FIG. 1-2 shows a cross-sectional SEM photograph (4000×) of the composite semi-permeable membrane obtained in Example 1.

FIG. 1-3 shows a cross-sectional SEM photograph (20000×) of the composite semi-permeable membrane obtained in Example 1.

FIG. 2-1 shows a cross-sectional SEM photograph (800×) of the composite semi-permeable membrane obtained in Example 2.

FIG. 2-2 shows a cross-sectional SEM photograph (4000×) of the composite semi-permeable membrane obtained in Example 2.

FIG. 2-3 shows a cross-sectional SEM photograph (20000×) of the composite semi-permeable membrane obtained in Example 2.

FIG. 3-1 shows a cross-sectional SEM photograph (800×) of the composite semi-permeable membrane obtained in Example 3.

FIG. 3-2 shows a cross-sectional SEM photograph (4000×) of the composite semi-permeable membrane obtained in Example 3.

FIG. 3-3 shows a cross-sectional SEM photograph (20000×) of the composite semi-permeable membrane obtained in Example 3.

FIG. 4-1 shows a cross-sectional SEM photograph (800×) of the composite semi-permeable membrane obtained in Example 4.

FIG. 4-2 shows a cross-sectional SEM photograph (4000×) of the composite semi-permeable membrane obtained in Example 4.

FIG. 4-3 shows a cross-sectional SEM photograph (20000×) of the composite semi-permeable membrane obtained in Example 4.

FIG. 6-1 shows a cross-sectional SEM photograph (800×) of the composite semi-permeable membrane obtained in Example 6.

FIG. 6-2 shows a cross-sectional SEM photograph (4000×) of the composite semi-permeable membrane obtained in Example 6.

FIG. 7-1 shows a cross-sectional SEM photograph (800×) of the composite semi-permeable membrane obtained in Comparative Example 1.

FIG. 7-2 shows a cross-sectional SEM photograph (4000×) of the composite semi-permeable membrane obtained in Comparative Example 1.

FIG. 7-3 shows a cross-sectional SEM photograph (20000×) of the composite semi-permeable membrane obtained in Comparative Example 1.

FIG. 8-1 shows a cross-sectional SEM photograph (800×) of the composite semi-permeable membrane obtained in Comparative Example 2.

FIG. 8-2 shows a cross-sectional SEM photograph (4000×) of the composite semi-permeable membrane obtained in Comparative Example 2.

FIG. 8-3 shows a cross-sectional SEM photograph (20000×) of the composite semi-permeable membrane obtained in Comparative Example 2.

MODE FOR CARRYING OUT THE INVENTION

Figure 1:
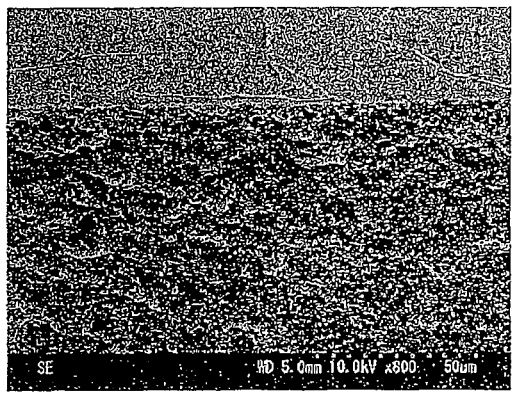
FIG. 1-1 shows a cross-sectional SEM photograph (800×) of the composite semi-permeable membrane obtained in Example 1.

The embodiments of the present invention will be described hereinbelow. A composite semi-permeable membrane according to the present invention is a membrane wherein a skin layer is formed on a surface of a porous support, and the porous support contains a thermosetting resin porous sheet having a three-dimensional network structure and pores communicating with each other.

In the present invention, a thermosetting resin composition containing a thermosetting resin, a curing agent and a porogen is used as a raw material for the thermosetting resin porous sheet.

The thermosetting resin usable in the present invention includes, for example, epoxy resins, phenol resins, melamine resins, urea resins (urea formaldehyde resins), alkyd resins, unsaturated polyester resins, polyurethanes, thermosetting polyimides, silicone resins and diallyl phthalate resins, and among them, epoxy resins are preferably used.

Hereinafter, the present invention will be described with reference to an example of a case where the thermosetting resin porous sheet is an epoxy resin porous sheet.

The epoxy resin includes, for example, polyphenyl-based epoxy resins (e.g. bisphenol A type epoxy resin, brominated bisphenol A type epoxy resin, bisphenol F type epoxy resin, bisphenol AD type epoxy resin, stilbene type epoxy resin, biphenyl type epoxy resin, bisphenol A novolac type epoxy resin, cresol novolac type epoxy resin, diaminodiphenylmethane type epoxy resin and tetrakis(hydroxyphenyl) ethane base), fluorene-containing epoxy resins, triglycidyl isocyanurates, aromatic epoxy resins (e.g. heteroaromatic ring (e.g. triazine ring)-containing epoxy resin); and non-aromatic epoxy resins (e.g. aliphatic glycidyl ether type epoxy resin, aliphatic glycidyl ester type epoxy resin, alicyclic glycidyl ether type epoxy resin, alicyclic glycidyl ester type epoxy resin). These epoxy resins may be used alone or in combination of two or more thereof.

Of these, in order to form a uniform three-dimensional structure and uniform pores as well as to secure chemical resistance and membrane strength, it is preferable to use at least one kind of aromatic epoxy resins selected from the group consisting of bisphenol A type epoxy resin, brominated bisphenol A type epoxy resin, bisphenol F type epoxy resin, bisphenol AD type epoxy resin, fluorene-containing epoxy resin and triglycidyl isocyanurate; at least one kind of alicyclic epoxy resins selected from the group consisting of alicyclic glycidyl ether type epoxy resin and alicyclic glycidyl ester type epoxy resin. Particularly, it is preferable to use at least one kind of aromatic epoxy resins each having an epoxy equivalent of 6000 or less and a melting point of 170° C. or less, selected from the group consisting of bisphenol A type epoxy resin, brominated bisphenol A type epoxy resin, bisphenol AD type epoxy resin, fluorene-containing epoxy resin and triglycidyl isocyanurate; at least one kind of alicyclic epoxy resins each having an epoxy equivalent of 6000 or less and a melting point of 170° C. or less, selected from the group consisting of alicyclic glycidyl ether type epoxy resin and alicyclic glycidyl ester type epoxy resin.

The curing agent usable in the present invention includes, for example, aromatic curing agents such as aromatic amines (e.g. metaphenylenediamine, diaminodiphenylmethane, diaminodiphenylsulfone, benzyldimethylamine, dimethylaminomethylbenzene), aromatic acid anhydrides (e.g. phthalic anhydride, trimellitic anhydride, pyromellitic anhydride), phenol resins, phenol novolac resins and heteroaromatic ring-containing amines (e.g. triazine ring-containing amine); and non-aromatic curing agents such as aliphatic amines (e.g. ethylenediamine, diethylenetriamine, triethylenetetramine, tetraethylenepentamine, iminobispropylamine, bis(hexamethylene)triamine, 1,3,6-trisaminomethylhexane, polymethylenediamine, trimethylhexamethylenediamine, polyether diamine), alicyclic amines (e.g. isophoronediamine, menthanediamine, N-aminoethylpiperazine, 3,9-bis(3-aminopropyl)2,4,8,10-tetraoxaspiro(5,5)undecane adduct, bis(4-amino-3-methylcyclohexyl)methane, bis(4-aminocyclohexyl)methane and modified product thereof), and aliphatic polyamideamines including polyamines and dimer acids. These curing agents may be used alone or in combination of two or more thereof.

Of these, in order to form a uniform three-dimensional structure and uniform pores as well as to secure membrane strength and elastic modulus, it is preferable to use at least one kind of aromatic amine curing agents each having two or more primary amines in the molecule, selected from the group consisting of metaphenylenediamine, diaminodiphenylmethane and diaminodiphenylsulfone; and at least one kind of alicyclic amine curing agents each having two or more primary amines in the molecule, selected from the group consisting of bis(4-amino-3-methylcyclohexyl)methane and bis (4-aminocyclohexyl)methane.

In addition, a preferable combination of the epoxy resin and the curing agent is a combination of an aromatic epoxy resin and an alicyclic amine curing agent, or a combination of an alicyclic epoxy resin and an aromatic amine curing agent. By using these combinations, heat resistance of the resulting epoxy resin porous sheet becomes higher and thus such a sheet is preferably used as a porous support for the composite semi-permeable membranes.

The porogen that can be used in the present invention is a solvent capable of dissolving an epoxy resin and a curing agent as well as capable of causing reaction-induced phase separation after polymerization between the epoxy resin and the curing agent, and examples thereof include cellosolves (e.g. methyl cellosolve, ethyl cellosolve), esters (e.g. ethylene glycol monomethyl ether acetate, propylene glycol monomethyl ether acetate), and glycols (e.g. polyethylene glycol, polypropylene glycol). These solvents may be used alone or in combination of two or more thereof.

Of these, in order to form a uniform three-dimensional structure and uniform pores, it is preferable to use at least one member selected from the group consisting of methyl cellosolve, ethyl cellosolve, polyethylene glycol with a molecular weight of 600 or less, ethylene glycol monomethyl ether acetate, polypropylene glycol, polyoxyethylene monomethyl ether, polyoxyethylene dimethyl ether and propylene glycol monomethyl ether acetate, and it is particularly preferable to use at least one member selected from the group consisting of polyethylene glycol with a molecular weight of 200 or less, polypropylene glycol with a molecular weight of 500 or less, polyoxyethylene monomethyl ether and propylene glycol monomethyl ether acetate.

Any solvent that can dissolve the reaction product between the epoxy resin and the curing agent may be used as a porogen even if it is insoluble or hardly soluble in individual epoxy resins or curing agents at normal temperature. Such a porogen includes, for example, brominated bisphenol A type epoxy resins ("EPICOAT 5058" manufactured by Japan Epoxy Resin Co., Ltd.).

It is preferable to select the optimal conditions after drawing a phase diagram of the system in order to obtain the desired porosity, average pore diameter and pore diameter distribution because the porosity, average pore diameter and pore diameter distribution of the epoxy resin porous sheet vary depending on the kind and mixing ratio of raw materials (e.g. epoxy resins, curing agents, porogens) to be used as well as on the reaction conditions such as heating temperature and heating time in the reaction-induced phase separation. In addition, by controlling the molecular weight and molecular weight distribution of the cross-linked epoxy resin, viscosity of the system, and the speed of the cross-linking reaction at the time of phase separation, a stable porous structure can be obtained after fixation of a bicontinuous structure between the cross-linked epoxy resin and the porogen to a specific state.

The kinds and blending ratios of an epoxy resin and a curing agent are preferably determined such that the proportion of aromatic ring-derived carbon atoms to all the carbon atoms constituting an epoxy resin porous sheet is in the range of 0.1 to 0.65. When the above value is less than 0.1, the recognition properties of the plane structure of the separation medium, which is the characteristic of the epoxy resin porous sheet, tend to be decreased. On the other hand, when the above value exceeds 0.65, it becomes difficult to form a uniform three-dimensional structure.

In addition, the blending ratio of a curing agent to an epoxy resin is preferably 0.6 to 1.5 equivalents of the curing agent per one equivalent of an epoxy group. If the curing agent equivalent is less than 0.6, the cross-linking density of the cured product becomes decreased, and heat resistance as well as solvent resistance tends to decrease. On the other hand, if the curing agent equivalent exceeds 1.5, unreacted curing agent tends to remain or to inhibit the enhancement of the cross-linking density. In the present invention, a curing accelerator other than the above-mentioned curing agents may be added to obtain the desired porous structure. The curing accelerators that can be used are well-known substances, including, for example, tertiary amines such as triethylamine and tributylamine, and imidazoles such as 2-phenol-4-methylimidazole, 2-ethyl-4-methylimidazole and 2-phenol-4,5-dihydroxyimidazole.

It is preferable to use a porogen in an amount of 40 to 80% by weight based on the total weight of the epoxy resin, curing agent and porogen so that the average pore diameter of the epoxy resin porous sheet may be adjusted to 0.01 to 0.4 μm. If the amount of the porogen is less than 40% by weight, the average pore diameter becomes too small, or no pores tend to be formed. On the other hand, if the amount of the porogen exceeds 80% by weight, the average pore diameter becomes too large, resulting in failure to form a uniform skin layer on a porous body, or the salt-blocking property tends to remarkably decrease. The average pore diameter of the epoxy resin porous sheet is preferably 0.05 to 0.3 μm, and more preferably 0.05 to 0.2 μm. For that purpose, it is preferable to use a porogen in amount of 60 to 70% by weight, and particularly preferably in an amount of 60 to 65% by weight.

Moreover, as a method of adjusting the average pore diameter of the epoxy resin porous sheet to 0.01 to 0.4 μm, it is also suitable to mix two or more epoxy resins each having a different epoxy equivalent and to use them. In this case, it is preferable that the difference between the epoxy equivalents is 100 or more.

In addition, the average pore diameter of the epoxy resin porous sheet can be adjusted within a target range by appropriately setting various conditions such as the ratio of the entire epoxy equivalents to the porogen and the curing temperature.

The epoxy resin porous sheet mentioned above can be formed, for example, by the following methods.

1) An epoxy resin composition containing an epoxy resin, a curing agent and a porogen is applied on a substrate and then the applied epoxy resin composition is heated so that the epoxy resin is cross-linked in three dimensions. In this case, a bicontinuous structure is formed due to the phase separation between the cross-linked epoxy resin and the porogen. Thereafter, the porogen is removed from the resulting epoxy resin sheet by washing, and the epoxy resin sheet is dried to produce an epoxy resin porous sheet having a three-dimensional network structure and pores communicating with each other. The substrate used is not particularly limited, and includes, for example, a plastic substrate, a glass substrate and a metallic board.

2) An epoxy resin composition containing an epoxy resin, a curing agent and a porogen is applied on a substrate, and then another substrate is covered on the applied epoxy resin composition, thereby to produce a sandwich structure product. In addition, it is preferable to provide spacers (e.g., double-sided pressure sensitive adhesive tape) in the four corners of the substrate to make a constant thickness between the substrates. The sandwich structure product is heated so that the epoxy resin is cross-linked in three dimensions. In this case, a bicontinuous structure is formed due to the phase separation between the cross-linked epoxy resin and the porogen. Thereafter, the resulting epoxy resin sheet is taken out, washed to remove the porogen, and dried to form an epoxy resin porous sheet having a three-dimensional network structure and pores communicating with each other. The substrate used is not particularly limited, and includes, for example, a plastic substrate, a glass substrate and a metallic board, and use of a glass substrate is particularly preferable.

3) An epoxy resin composition containing an epoxy resin, a curing agent and a porogen is filled into a mold in a given shape, and then reaction is promoted so that the epoxy resin is cross-linked in three dimensions, thereby to produce a cylindrical or pillar shape resin block. In this case, a bicontinuous structure is formed due to the phase separation between the cross-linked epoxy resin and the porogen. Thereafter, the epoxy resin sheet in the form of a long sheet is formed by cutting a surface of the block at a certain thickness while rotating the block around the cylinder or column axis. Then the porogen is removed from the epoxy resin sheet by washing, and dried to form an epoxy resin porous sheet having a three-dimensional network structure and pores communicating with each other.

The conditions for curing the epoxy resin composition (including heat curing or room temperature curing) are not particularly limited, but it is preferable to carry out the room temperature curing so as to form a porous sheet having uniform pores. In the case of room temperature curing, the curing is started at about 20 to 40° C., and the curing time is approximately 3 to 100 hours, preferably about 20 to 50 hours. In the case of heat curing, the temperature is approximately 40 to 120° C., preferably about 60 to 100° C., and the curing time is approximately 10 to 300 minutes, preferably about 30 to 180 minutes.

The solvent used for the removal of the porogen from the obtained epoxy resin sheet includes, for example, water, DMF, DMSO, THF, and mixed solvents thereof, and these solvents are appropriately selected depending on the kind of porogens.

The drying conditions of the epoxy resin porous sheet from which a porogen has been removed are not particularly limited, but the temperature is approximately 40 to 120° C., and the drying time is about 3 minutes to 3 hours.

The thickness of the epoxy resin porous sheet is not particularly limited, but it is about 20 to 250 μm from the viewpoint of strength as well as practical water permeability and salt-blocking property. In addition, the rear side of the epoxy resin porous sheet may be reinforced with a woven fabric, a nonwoven fabric, and the like.

On the other hand, the material of forming a skin layer is not particularly limited, and includes, for example, cellulose acetate, ethyl cellulose, polyether, polyester and polyamide.

In the present invention, it is preferred that a skin layer includes a polyamide-based resin obtained through polymerization between a polyfunctional amine component and a polyfunctional acid halide component.

The polyfunctional amine component is defined as a polyfunctional amine having two or more reactive amino groups, and includes aromatic, aliphatic, and alicyclic polyfunctional amines.

The aromatic polyfunctional amines include, for example, m-phenylenediamine, p-phenylenediamine, o-phenylenediamine, 1,3,5-triamino benzene, 1,2,4-triamino benzene, 3,5-diaminobenzoic acid, 2,4-diaminotoluene, 2,6-diaminotoluene, N,N'-dimethyl-m-phenylenediamine, 2,4-diaminoanisole, amidol, xylylene diamine etc.

The aliphatic polyfunctional amines include, for example, ethylenediamine, propylenediamine, tris(2-aminoethyl)amine, n-phenylethylenediamine, etc.

The alicyclic polyfunctional amines include, for example, 1,3-diaminocyclohexane, 1,2-diaminocyclohexane, 1,4-diaminocyclohexane, piperazine, 2,5-dimethylpiperazine, 4-aminomethyl piperazine, etc.

These polyfunctional amines may be used independently, and two or more kinds may be used in combination. In order to obtain a skin layer having a higher salt-blocking property, it is preferred to use the aromatic polyfunctional amines.

The polyfunctional acid halide component represents polyfunctional acid halides having two or more reactive carbonyl groups.

The polyfunctional acid halides include aromatic, aliphatic, and alicyclic polyfunctional acid halides.

The aromatic polyfunctional acid halides include, for example trimesic acid trichloride, terephthalic acid dichloride, isophthalic acid dichloride, biphenyl dicarboxylic acid dichloride, naphthalene dicarboxylic acid dichloride, benzenetrisulfonic acid trichloride, benzenedisulfonic acid dichloride, chlorosulfonyl benzenedicarboxylic acid dichloride etc.

The aliphatic polyfunctional acid halides include, for example, propanedicarboxylic acid dichloride, butane dicarboxylic acid dichloride, pentanedicarboxylic acid dichloride, propane tricarboxylic acid trichloride, butane tricarboxylic acid trichloride, pentane tricarboxylic acid trichloride, glutaryl halide, adipoyl halide etc.

The alicyclic polyfunctional acid halides include, for example, cyclopropane tricarboxylic acid trichloride, cyclobutanetetracarboxylic acid tetrachloride, cyclopentane tricarboxylic acid trichloride, cyclopentanetetracarboxylic acid tetrachloride, cyclohexanetricarboxylic acid trichloride, tetrahydrofurantetracarboxylic acid tetrachloride, cyclopentanedicarboxylic acid dichloride, cyclobutanedicarboxylic acid dichloride, cyclohexanedicarboxylic acid dichloride, tetrahydrofuran dicarboxylic acid dichloride, etc.

These polyfunctional acid halides may be used independently, and two or more kinds may be used in combination. In order to obtain a skin layer having higher salt-blocking property, it is preferred to use aromatic polyfunctional acid halides. In addition, it is preferred to form a cross linked structure using polyfunctional acid halides having trivalency or more as at least a part of the polyfunctional acid halide components.

Furthermore, in order to improve performance of the skin layer including the polyamide resin, polymers such as polyvinyl alcohol, polyvinylpyrrolidone, and polyacrylic acids etc., and polyhydric alcohols, such as sorbitol and glycerin may be copolymerized.

Processes for forming the skin layer including the polyamide resin on the surface of the epoxy resin porous sheet is not in particular limited, and any publicly known methods may be used. For example, the publicly known methods include an interfacial condensation method, a phase separation method, a thin film application method, etc. The interfacial condensation method is a method, wherein an amine aqueous solution containing a polyfunctional amine component, an organic solution containing a polyfunctional acid halide component are forced to contact together to form a skin layer by an interfacial polymerization, and then the obtained skin layer is laid on an epoxy resin porous sheet, and a method wherein a skin layer of a polyamide resin is directly formed on an epoxy resin porous sheet by the above-described interfacial polymerization on an epoxy resin porous sheet. Details, such as conditions of the interfacial condensation method, are described in Japanese Patent Application Laid-Open No. 58-24303, Japanese Patent Application Laid-Open No. 01-180208, and these known methods are suitably employable.

In the present invention, a method is especially preferable in which a covering layer of aqueous solution made from the amine aqueous solution containing a polyfunctional amine component is formed on the epoxy resin porous sheet, and subsequently an interfacial polymerization is performed by contact of an organic solution containing a polyfunctional acid halide component with the covering layer of aqueous solution, and then a skin layer is formed.

In the interfacial polymerization method, although the concentration of the polyfunctional amine component in the amine aqueous solution is not in particular limited, the concentration is preferably 0.1 to 5% by weight, and more preferably 1 to 4% by weight. Less than 0.1% by weight of the concentration of the polyfunctional amine component may easily cause defect such as pinhole. in the skin layer, leading to tendency of deterioration of salt-blocking property. On the other hand, the concentration of the polyfunctional amine component exceeding 5% by weight allows to be an excessively large thickness and to raise the permeation resistance, likely giving deterioration of the permeation flux.

Although the concentration of the polyfunctional acid halide component in the organic solution is not in particular limited, it is preferably 0.01 to 5% by weight, and more preferably 0.05 to 3% by weight. Less than 0.01% by weight of the concentration of the polyfunctional acid halide component is apt to make the unreacted polyfunctional amine component remain, to cause defect such as pinhole in the skin layer, leading to tendency of deterioration of salt-blocking property. On the other hand, the concentration exceeding 5% by weight of the polyfunctional acid halide component is apt to make the unreacted polyfunctional acid halide component remain, to be an excessively large thickness and to raise the permeation resistance, likely giving deterioration of the permeation flux.

The organic solvents used for the organic solution is not especially limited as long as they have small solubility to water, and do not cause degradation of the epoxy resin porous sheet, and dissolve the polyfunctional acid halide component. For example, the organic solvents include saturated hydrocarbons, such as cyclohexane, heptane, octane, and nonane, halogenated hydrocarbons, such as 1,1,2-trichlorofluoroethane, etc. They are preferably saturated hydrocarbons having a boiling point of 300° C. or less, and more preferably 200° C. or less.

Various kinds of additives may be added to the amine aqueous solution or the organic solution in order to provide easy film production and to improve performance of the composite semi-permeable membrane to be obtained. The additives include, for example, surfactants, such as sodium dodecylbenzenesulfonate, sodium dodecyl sulfate, and sodium lauryl sulfate; basic compounds, such as sodium hydroxide, trisodium phosphate, triethylamine, etc. for removing hydrogen halides formed by polymerization; acylation catalysts; compounds having a solubility parameter of 8 to 14 $(cal/cm^3)^{1/2}$ described in Japanese Patent Application Laid-Open No. 08-224452.

The period of time after application of the amine aqueous solution until application of the organic solution on the epoxy resin porous sheet is about 1 to 180 seconds, preferably 2 to 120 seconds, more preferably 2 to 40 seconds, and especially preferably 2 to 10 seconds, depending on the composition and viscosity of the amine aqueous solution, and on the pore diameter of the surface of the epoxy resin porous sheet. When an application interval of the above solution is too long, the amine aqueous solution permeates and diffuses deeply into the internal portion of the epoxy resin porous sheet, and a large amount of unreacted polyfunctional amine components might remain in the epoxy resin porous sheet. In addition, the unreacted polyfunctional amine components that have permeated deeply into the internal portion of the epoxy resin porous sheet tend to be hard to be removed even by the subsequent membrane washing processing. When the application interval of the above solution is too short, an excessive amine aqueous solution remains too much, resulting in a tendency to decrease membrane performances.

In the present invention, after a covering layer of aqueous solution made from the amine aqueous solution is contacted with an organic solution, it is preferred to remove the excessive organic solution on the epoxy resin porous sheet, and dry the formed membrane on the epoxy resin porous sheet by heating at 70° C. or more, thereby to form a skin layer. The heat treatment of the formed membrane can improve its mechanical strength and heat resistance. The heating temperature is more preferably 70° C. to 200° C., and particularly preferably 80 to 130° C. The heating period of time is preferably about 30 seconds to 10 minutes, and more preferably about 40 seconds to 7 minutes.

The thickness of the skin layer formed on the epoxy resin porous sheet is not particularly limited, but it is usually 0.05 to 2 µm, preferably 0.1 to 1 µm.

The shape of the composite semi-permeable membrane of the present invention is not limited at all. That is, the composite semi-permeable membrane can take all possible membrane shapes, such as flat membrane shapes and spiral element shapes. In addition, various conventionally known treatments may be applied to the composite semi-permeable membrane in order to improve the salt-blocking property, water permeability, resistance against oxidizing agents, and the like.

Moreover, in the present invention, a dry type of composite semi-permeable membrane may be made in view of superiority in processability and preservability. When drying treatment is carried out, the shape of the semi-permeable membrane is not limited at all. That is, drying treatment is possible in all possible membrane shapes including flat membrane shapes or spiral element shapes. For example, a membrane unit is formed by processing a semi-permeable membrane into a spiral shape, and a dry spiral element is formed by drying the membrane unit.

EXAMPLES

The present invention will, hereinafter, be described with reference to Examples, but the present invention is not limited at all by these Examples.

Evaluation and Measuring Method (Measurement of Average Pore Diameter of Epoxy Resin Porous Sheet)

The average pore diameter of an epoxy resin porous sheet was measured by a mercury intrusion porosimetry using an AutoPore 9520 manufactured by Shimadzu Corporation. Further, a median diameter under the condition of an initial pressure of 7 kPa was adopted as the average pore diameter.

(Measurement of Permeation Flux and Salt-Blocking Rate)

The produced composite semi-permeable membrane with a shape of a flat film is cut into a predetermined shape and size, and is set to a cell for flat film evaluation. An aqueous solution containing NaCl of about 1500 mg/L and adjusted to a pH of 6.5 to 7.5 with NaOH was forced to contact to a supply side, and a permeation side of the membrane at a differential pressure of 1.5 Mpa at 25° C. A permeation velocity and an electric conductivity of the permeated water obtained by this operation were measured for, and a permeation flux ($m^3/m^2 \cdot d$) and a salt-blocking rate (%) were calculated. The correlation (calibration curve) of the NaCl concentration and the electric conductivity of the aqueous solution was beforehand made, and the salt-blocking rate was calculated by a following equation.

Salt-blocking rate (%)={1−(NaCl concentration [mg/L] in permeated liquid)/(NaCl concentration [mg/L] in supply solution)}×100

Example 1

Production of Epoxy Resin Porous Sheet

To 23.3 g of bisphenol A type epoxy resin (Tohto Kasei Co., Ltd., brand name "YD-128", epoxy equivalent: 184 to 194 (g/eq)) was added 53 g of Polyethylene glycol (Tokyo Chemical Industry Co., Ltd., brand name "PEG 200"), and the mixture was stirred at 2000 rpm for 5 minutes for dissolution, using a rotation/revolution mixer (brand name: "Awatori Rentaro" ARE-250), thereby to obtain an epoxy resin/polyethylene glycol solution. Then, 5.2 g of bis(4-aminocyclohexyl)methane (Tokyo Chemical Industry Co., Ltd.) was added to the epoxy resin/polyethylene glycol solution, and the mixture was stirred at 2000 rpm for 10 minutes for dissolution, using a rotation/revolution mixer, thereby to obtain an epoxy resin/polyethylene glycol/curing agent solution. The epoxy resin/polyethylene glycol/curing agent solution was applied on a soda glass plate provided with double-sided pressure sensitive adhesive tapes in the four corners, and another soda glass plate was laminated thereon to obtain a sandwich structure product. Thereafter, the sandwich structure product was placed in a dryer and allowed to react for curing at 120° C. for 3 hours. After cooling, the epoxy resin sheet was taken out and immersed in water for 12 hours to remove the polyethylene glycol. Then, the sheet was dried in a dryer at 50° C. for about 4 hours to obtain an epoxy resin porous sheet.

(Production of Composite Semi-Permeable Membrane)

Figures 1, 2:
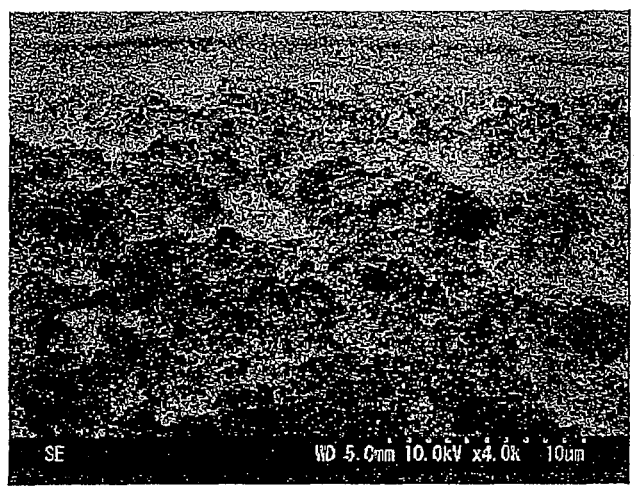
Figures 1, 2, 3:
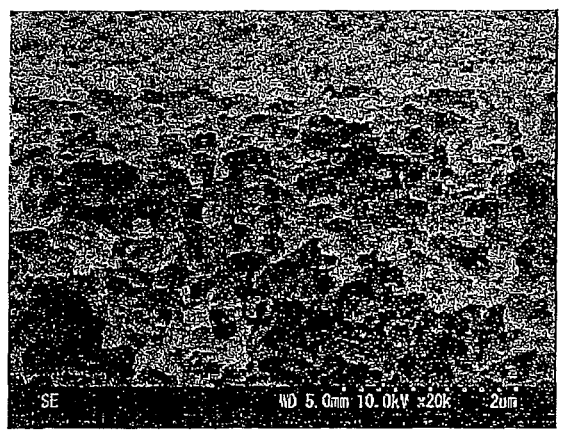
Figures 1, 2:
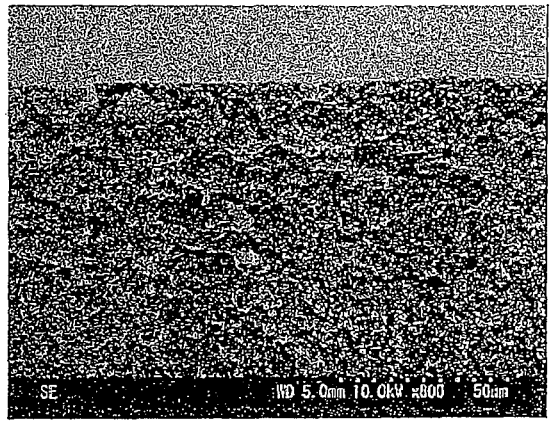
Figure 2:
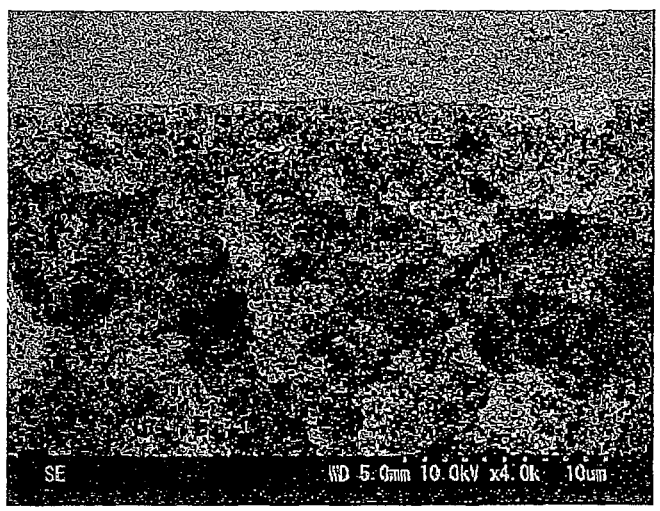
Figures 2, 3:
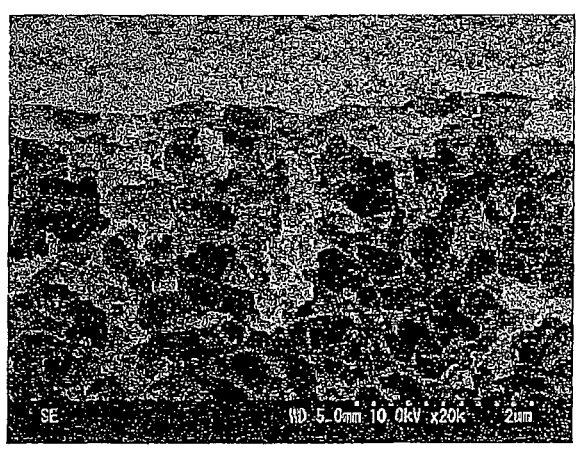
Figures 1, 3:
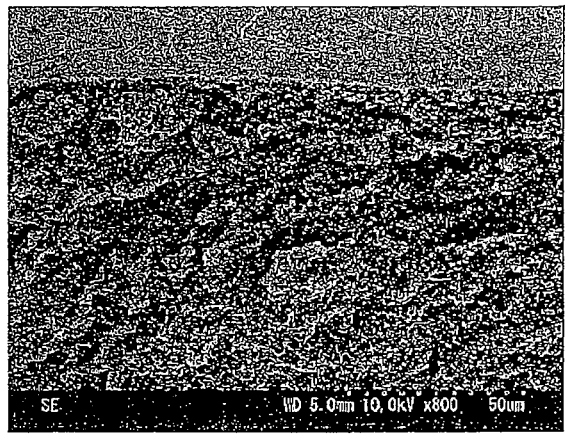
Figures 2, 3:
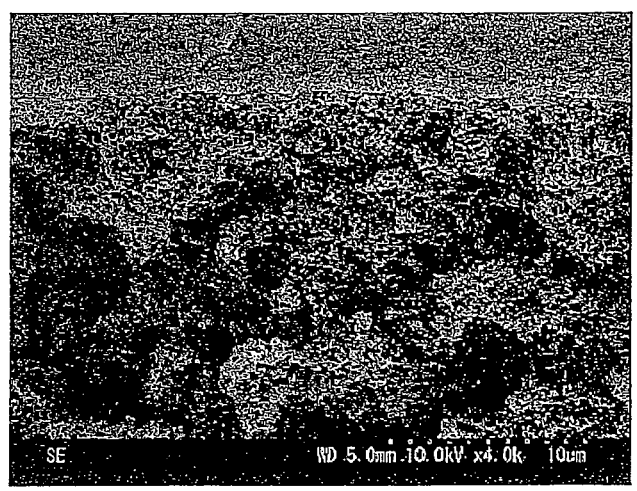
Figure 3:
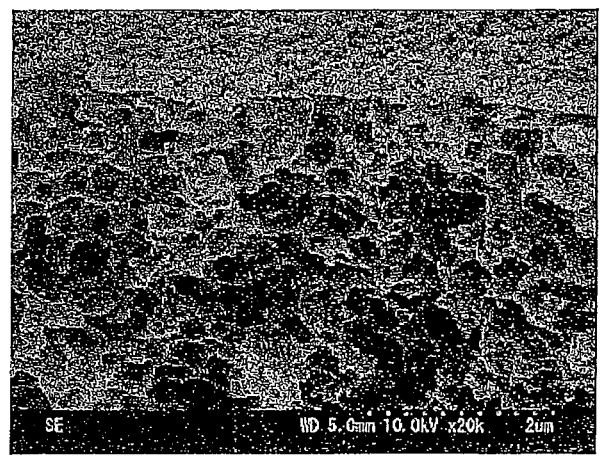

An amine aqueous solution containing 3% by weight of m-phenylenediamine, 3% by weight of triethylamine and 6% by weight of camphorsulfonic acid was applied on the epoxy resin porous sheet, and then an excessive amount of amine aqueous solution was removed to form a covering layer of aqueous solution. Subsequently, an isooctane solution containing 0.2% by weight of trimesic acid chloride was applied to a surface of the covering layer of aqueous solution. Then, the excessive solution was removed and the material was maintained in a hot air dryer of 120° C. for 3 minutes to form a skin layer containing a polyamide-based resin on the epoxy resin porous sheet, and thus a composite semi-permeable membrane was obtained. A permeation test was carried out using the formed composite semi-permeable membrane. The results of the permeation tests are shown in Table 1. Cross-sectional scanning electron microscope (SEM) photographs (800×, 4000×, 20000×) of the composite semi-permeable membrane after the permeation test are shown in FIGS. 1-1 to 1-3. It is understood that a skin layer is formed on the epoxy resin porous sheet without a defect.

Example 2

As described in Table 1, an epoxy resin porous sheet was produced in the same manner as in Example 1, except that 11.6 g of bisphenol A type epoxy resin (YD-128), 11.6 g of bisphenol A type epoxy resin (Tohto Kasei Co., Ltd., brand name "YD-011", epoxy equivalent: 450 to 500 (g/eq)), and 60 g of polyethylene glycol (Tokyo Chemical Industry Co., Ltd., brand name "PEG 200") were used. Then, a composite semi-permeable membrane was produced in the same manner as in Example 1, using the obtained epoxy resin porous sheet. A permeation test was carried out using the formed composite semi-permeable membrane. The results of the permeation tests are shown in Table 1. Cross-sectional scanning electron microscope (SEM) photographs (800×, 4000×, 20000×) of the composite semi-permeable membrane after the permeation test are shown in FIGS. 2-1 to 2-3. It is understood that a skin layer is formed on the epoxy resin porous sheet without a defect.

Example 3

As described in Table 1, an epoxy resin porous sheet was produced in the same manner as in Example 2, except that 62 g of polyethylene glycol (Tokyo Chemical Industry Co., Ltd., brand name "PEG 200") was used. Then, a composite semi-permeable membrane was produced in the same manner as in Example 1, using the obtained epoxy resin porous sheet. A permeation test was carried out using the formed composite semi-permeable membrane. The results of the permeation tests are shown in Table 1. Cross-sectional scanning electron microscope (SEM) photographs (800×, 4000×, 20000×) of the composite semi-permeable membrane after the permeation test are shown in FIGS. 3-1 to 3-3. It is understood that a skin layer is formed on the epoxy resin porous sheet without a defect.

Example 4

Figures 1, 4:
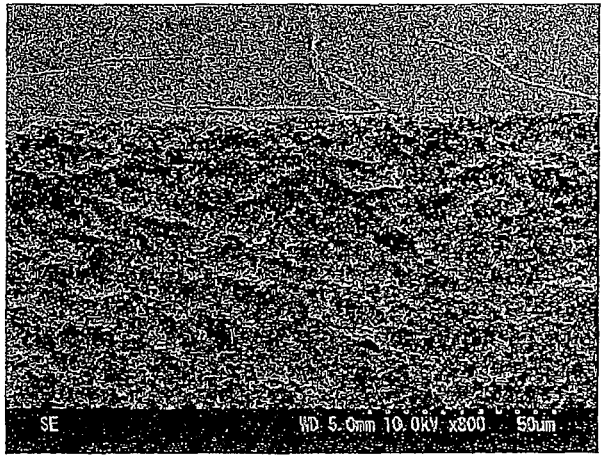
Figures 2, 4:
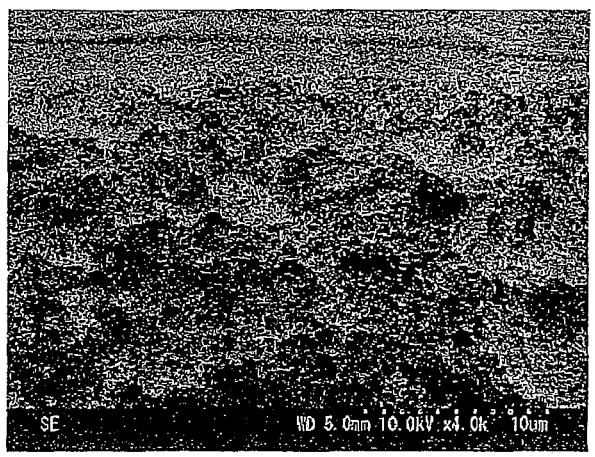
Figures 3, 4:
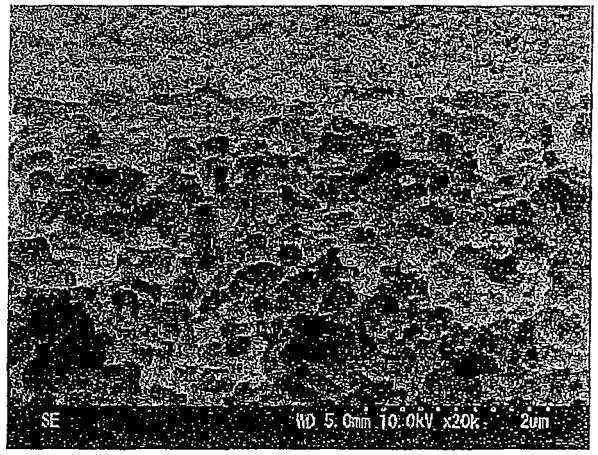

As described in Table 1, an epoxy resin porous sheet was produced in the same manner as in Example 2, except that 64 g of polyethylene glycol (Tokyo Chemical Industry Co., Ltd., brand name "PEG 200") was used. Then, a composite semi-permeable membrane was produced in the same manner as in Example 1, using the obtained epoxy resin porous sheet. A permeation test was carried out using the formed composite semi-permeable membrane. The results of the permeation tests are shown in Table 1. Cross-sectional scanning electron microscope (SEM) photographs (800×, 4000×, 20000×) of the composite semi-permeable membrane after the permeation test are shown in FIGS. 4-1 to 4-3. It is understood that a skin layer is formed on the epoxy resin porous sheet without a defect.

Example 5

Production of Epoxy Resin Porous Sheet

A release agent (QZ-13, manufactured by Nagase ChemteX Corporation) was thinly applied to inside of a 5 L-stainless steel container, and the stainless container was dried in a dryer that had been set to 40 to 100° C. In 3087.2 g of polyethylene glycol (brand name "PEG200", manufactured by Sanyo Chemical Industries, Ltd.) were dissolved 1094.6 g of Bisphenol A type epoxy resin (brand name "jER827", manufactured by Japan Epoxy Resin Co. Ltd.), 156.4 g of bisphenol A type epoxy resin (brand name "jER1001", manufactured by Japan Epoxy Resin Co. Ltd.), and 312.8 g of bisphenol A type epoxy resin (brand name "jER1009", manufactured by Japan Epoxy Resin Co. Ltd.) to prepare an epoxy resin/polyethylene glycol solution. Then, the epoxy resin/polyethylene glycol solution prepared was charged into the stainless steel container. Thereafter, 349 g of 4,4'-dicyclohexyldiamine (brand name "PACM-20", manufactured by DKSH Holding Ltd.) was charged into the stainless steel container. Using a three-one motor, the mixture was stirred at 300 rpm for 30 minutes with an anchor wing. Then, using a vacuum cup (AZONE VZ type), the mixture was defoamed under vacuum until foams disappeared under a pressure of about 0.1 MPa. After allowing the product to stand for about 2 hours, stirring was again carried out for about 30 minutes using a three-one motor to effect defoaming again under vacuum. Then, the defoamed product was allowed to stand at 25° C. for 24 hours, resulting in curing. Subsequently, a second curing was carried out with a hot air circulating dryer set to 80° C. for 24 hours. An epoxy resin block was taken out from the stainless steel container and cut into a thin sheet of 100 to 150 µm using a cutting lathe to obtain an epoxy resin sheet. The epoxy resin sheet was washed with water to remove the polyethylene glycol, and then dried at 70° C. for 2 minutes, at 80° C. for 1 minute, and at 90° C. for 1 minute, thereby to produce an epoxy resin porous sheet.

(Production of Composite Semi-Permeable Membrane)

Figure 5:
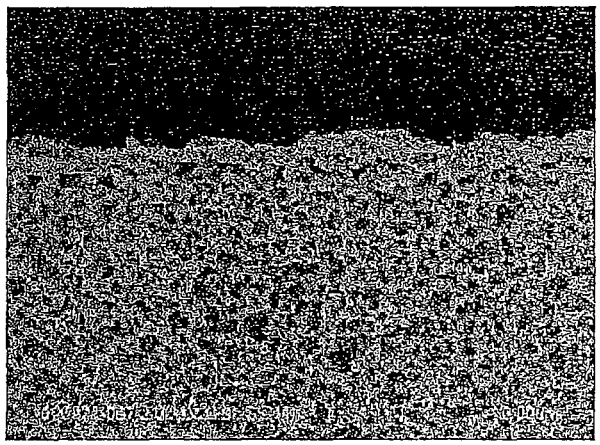
FIG. 5 shows a cross-sectional SEM photograph (20000×) of the composite semi-permeable membrane obtained in Example 5.

A composite semi-permeable membrane was produced in the same manner as in Example 1, using the obtained epoxy resin porous sheet. A permeation test was carried out using the formed composite semi-permeable membrane. The results of the permeation tests are shown in Table 1. Cross-sectional scanning electron microscope (SEM) photograph (20000×) of the composite semi-permeable membrane after the permeation test is shown in FIG. 5. It is understood that a skin layer is formed on the epoxy resin porous sheet without a defect.

Example 6

Figures 1, 6:
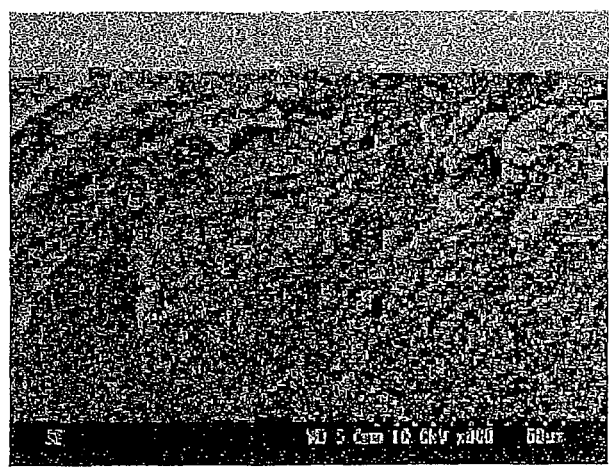
Figures 2, 6:
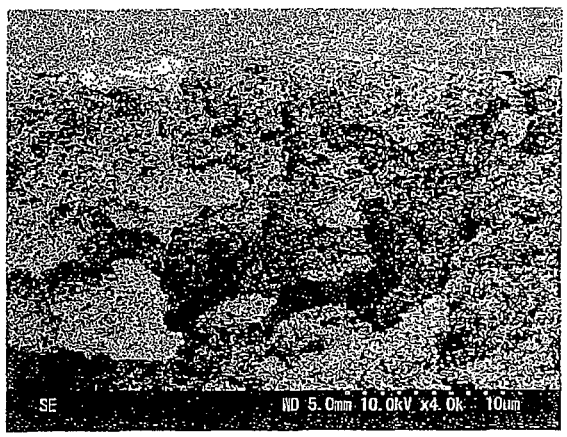

An epoxy resin porous sheet was produced in the same manner as in Example 5, except that 3355.7 g of polypropylene glycol (brand name "D-250", manufactured by NOF Corporation) was used in place of 3087.2 g of polyethylene glycol (brand name "PEG200", manufactured by Sanyo Chemical Industries, Ltd.). A composite semi-permeable membrane was produced in the same manner as in Example 1, using the obtained epoxy resin porous sheet. A permeation test was carried out using the formed composite semi-permeable membrane. The results of the permeation tests are shown in Table 1. Cross-sectional scanning electron microscope (SEM) photographs (800×, 4000×) of the composite semi-permeable membrane after the permeation test are also shown in FIGS. 6-1 and 6-2. It is understood that a skin layer is formed on the epoxy resin porous sheet without a defect.

Comparative Example 1

Figures 1, 7:
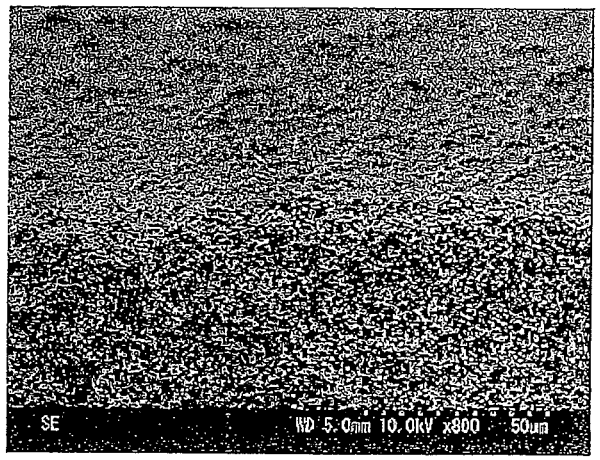
Figures 2, 7:
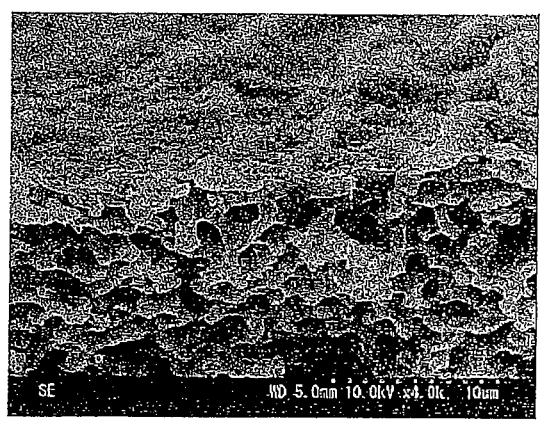
Figures 3, 7:
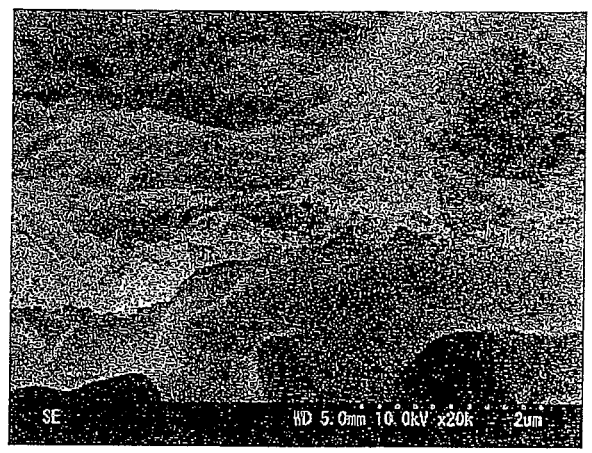

As described in Table 1, an epoxy resin porous sheet was produced in the same manner as in Example 1, except that 60 g of polyethylene glycol (Tokyo Chemical Industry Co., Ltd., brand name "PEG 200") was used. Then, a composite semi-permeable membrane was produced in the same manner as in Example 1, using the obtained epoxy resin porous sheet. A permeation test was carried out using the formed composite semi-permeable membrane. The results of the permeation tests are shown in Table 1. Cross-sectional scanning electron microscope (SEM) photographs (800×, 4000×, 20000×) of the composite semi-permeable membrane after the permeation test are shown in FIGS. 7-1 to 7-3. It is understood that there is a void-like defect in the skin layer on the epoxy resin porous sheet.

Comparative Example 2

Figures 1, 8:
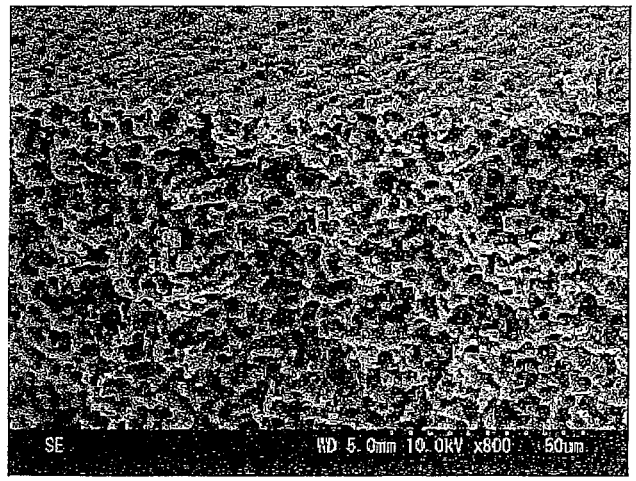
Figures 2, 8:
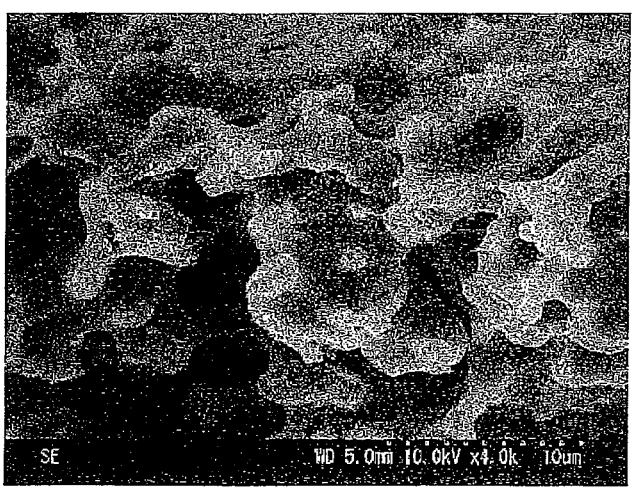
Figures 3, 8:

As described in Table 1, an epoxy resin porous sheet was produced in the same manner as in Example 1, except that 70 g of polyethylene glycol (Tokyo Chemical Industry Co., Ltd., brand name "PEG 200") was used. Then, a composite semi-permeable membrane was produced in the same manner as in Example 1, using the obtained epoxy resin porous sheet. A permeation test was carried out using the formed composite semi-permeable membrane. The results of the permeation tests are shown in Table 1. Cross-sectional scanning electron microscope (SEM) photographs (800×, 4000×, 20000×) of the composite semi-permeable membrane after the permeation test are shown in FIGS. 8-1 to 8-3. It is understood that there are a void-like defect and a crack in the skin layer on the epoxy resin porous sheet.

TABLE 1

| | Epoxy Resin | | | | | Porogen | | Curing | Average Pore | Salt-blocking | Permeation |
| | YD-128 (g) | YD-011 (g) | jER827 (g) | jER1001 (g) | jER1009 (g) | PEG200 (g) | D-250 (g) | Agent (g) | Diameter (μm) | property (%) | Flux (m³/m²·d) |
|---|---|---|---|---|---|---|---|---|---|---|---|
| Example 1 | 23.3 | — | — | — | — | 53 | — | 5.2 | 0.078 | 97.9 | 1.9 |
| Example 2 | 11.6 | 11.6 | — | — | — | 60 | — | 5.2 | 0.106 | 97.7 | 1.4 |
| Example 3 | 11.6 | 11.6 | — | — | — | 62 | — | 5.2 | 0.147 | 99.5 | 1.2 |
| Example 4 | 11.6 | 11.6 | — | — | — | 64 | — | 5.2 | 0.208 | 99.4 | 0.7 |
| Example 5 | — | — | 1094.6 | 156.4 | 312.8 | 3087.2 | — | 349 | 0.039 | 99.5 | 0.9 |
| Example 6 | — | — | 1094.6 | 156.4 | 312.8 | — | 3355.7 | 349 | 0.037 | 99.3 | 0.9 |
| Comparative Example 1 | 23.3 | — | — | — | — | 60 | — | 5.2 | 0.767 | 10.2 | 0.9 |
| Comparative Example 2 | 23.3 | — | — | — | — | 70 | — | 5.2 | 3.279 | 1.2 | 1.2 |

It is understood from Table 1 that each of the composite semi-permeable membranes of Examples 1 to 6 has high salt-blocking property, whereas each of the composite semi-permeable membranes of Comparative Examples 1 and 2 has very low salt-blocking property. It is believed that the average pore diameter of the epoxy resin porous sheet used as a porous support has a big influence on the salt-blocking property of the composite semi-permeable membrane.

The invention claimed is:

1. A composite semi-permeable membrane, comprising:
a porous support; and
a skin layer formed on a surface of the porous support,
wherein the porous support contains a cross-linked epoxy resin porous sheet having a three-dimensional network structure and pores communicating with each other,
wherein the cross-linked epoxy resin porous sheet consists essentially of epoxy resin,
wherein the three-dimensional network structure is formed from the cross-linked epoxy resin, and the cross-linked epoxy resin has pores communicating with each other,
wherein the pores of the cross-linked epoxy resin have an average diameter of 0.01 to 0.4 μm, and the skin layer is water permeable and salt-blocking, and
wherein the epoxy resin porous sheet contains, as a raw material component, two or more epoxy resins each having a different epoxy equivalent (grams/equivalent)
wherein the two or more epoxy resins differ in epoxy equivalents by 100 or more.

2. The composite semi-permeable membrane according to claim 1, wherein the porous support includes only a monolayer of the resin porous sheet.

3. The composite semi-permeable membrane according to claim 1, wherein the skin layer contains a polyamide-based resin.

4. The composite semi-permeable membrane according to claim 3, wherein the porous support includes only a monolayer of the resin porous sheet.

* * * * *